US006563995B2

(12) United States Patent
Keaton et al.

(10) Patent No.: US 6,563,995 B2
(45) Date of Patent: May 13, 2003

(54) OPTICAL WAVELENGTH FILTERING APPARATUS WITH DEPRESSED-INDEX CLADDINGS

(75) Inventors: Gregory L. Keaton, San Francisco, CA (US); Mark A. Arbore, Los Altos, CA (US); Thomas J. Kane, Menlo Park, CA (US)

(73) Assignee: Lightwave Electronics, Mountain View, CA (US)

( * ) Notice: Subject to any disclaimer, the term of this patent is extended or adjusted under 35 U.S.C. 154(b) by 0 days.

(21) Appl. No.: 09/825,148

(22) Filed: Apr. 2, 2001

(65) Prior Publication Data

US 2002/0172485 A1 Nov. 21, 2002

(51) Int. Cl.[7] .................................................. G02B 6/02
(52) U.S. Cl. ........................................ 385/127; 385/123
(58) Field of Search ......................... 385/11, 123, 124, 385/125, 126, 127

(56) References Cited

U.S. PATENT DOCUMENTS

| | | | |
|---|---|---|---|
| 4,515,436 A | | 5/1985 | Howard et al. .......... 350/96.33 |
| 4,836,640 A | * | 6/1989 | Gartside, III et al. ....... 385/112 |
| 5,056,888 A | | 10/1991 | Messerly et al. ............ 385/123 |
| 5,278,931 A | * | 1/1994 | Antos et al. ................. 385/126 |
| 5,473,714 A | | 12/1995 | Vengsarkar .................... 385/43 |
| 5,673,342 A | | 9/1997 | Nelson et al. ................. 385/24 |
| 5,852,690 A | * | 12/1998 | Haggans et al. ............... 385/37 |
| 5,892,615 A | | 4/1999 | Grubb et al. ................ 359/341 |
| 6,118,575 A | | 9/2000 | Grubb et al. ................ 359/337 |

OTHER PUBLICATIONS

Leonard G. Cohen; Dietrich Marcuse; Wanda L. Mammel, "Radiating Leaky–Mode Losses in Single–Mode Lightguides with Depressed–Index Claddings," IEEE Journal of Quantum Electronics, vol. QE–18, No. 10, Oct. 1982, pp. 1467–1472.

R.H. Stolen; W. Pleibel; J.R. Simpson; W.A. Reed; G. Mitchell; "Short W–Tunneling Fibre Polarisers," Electronics Letters, vol. 24, 1988, pp. 524–525.

* cited by examiner

Primary Examiner—Robert H. Kim
Assistant Examiner—Therese Barber
(74) Attorney, Agent, or Firm—Lumen Intellectual Property Services, Inc.

(57) ABSTRACT

An apparatus and a method for separating a light of a first wavelength $\lambda_1$ from a second wavelength $\lambda_2$, where $\lambda_1<\lambda_2$, in a waveguide such as an optical fiber is described. The apparatus includes a core surrounded by a depressed cladding, which itself is surrounded by a secondary cladding. The core cross-section, the depressed cladding cross-section, the secondary cladding cross-section, and the refractive indices of the core, the depressed cladding and the secondary cladding are selected to produce a fundamental mode cutoff wavelength $\lambda_c$ such that $\lambda_1\lambda_c<\lambda_2$, and produce a high loss at the secondary wavelength $\lambda_2$. The apparatus can be used as a filter, an amplifier, a laser, or in a nonlinear optical switch.

44 Claims, 5 Drawing Sheets

OPTICAL WAVELENGTH FILTERING APPARATUS WITH DEPRESSED-INDEX CLADDINGS

FIELD OF THE INVENTION

The present invention relates generally to optical wavelength filters, and in particular to passive and active filters using claddings with a depressed refractive index.

BACKGROUND OF THE INVENTION

Optical waveguides are designed to guide light of various modes and polarization states contained within a range of wavelengths in a controlled fashion. Single-mode optical fiber is the most common waveguide for long-distance delivery of light. Other waveguides, such as diffused waveguides, ion-exchanged waveguides, strip-loaded waveguides, planar waveguides, and polymer waveguides are commonly used for guiding light over short distances and especially for combining or separating light of different wavelengths, optical frequency mixing in nonlinear optical materials, modulating light and integrating many functions and operations into a small space.

In essence, a waveguide is a high refractive index material, usually referred to as core in optical fiber, immersed in a lower index material or structure, usually referred to as cladding, such that light injected into the high index material within an acceptance cone is generally confined to propagate through it. That is because at the interface between the high and low index materials the light undergoes total internal reflection (TIR) back into the high index material.

The advent of active fiber elements such as Er-doped amplifiers and fiber lasers has resulted in further developments in fiber claddings. For example, fibers with profiles designed for "cladding pumping" have been developed to stimulate lasing in the active core of single-mode fibers. Such fibers typically have a core, a multi-mode cladding layer and an outermost cladding layer. The pumping light is in-coupled into the multi-mode cladding layer and it crisscrosses the core as it propagates thus stimulating lasing. Unfortunately, once the fiber core is stimulated to emit at the desired emission wavelength, the core can also produce an unwanted signal at the so-called "Raman wavelength" due to stimulated Raman scattering. The Raman effect shifts the emission wavelength to the first Stokes wavelength of the fiber core and becomes dominant at high power levels. Hence, the output power of cladding pumped fiber lasers at the desired output wavelength is limited.

Similar problems occur when the active material in the medium has other emission wavelengths that are stimulated along with the desired emission wavelength. This problem is commonly referred to as amplified spontaneous emission (ASE) and may prevent the laser from operating at the desired wavelength by "drowning out" the desired frequency with much higher ASE intensity output at the undesired wavelengths. An example of this situation is encountered when working with neodymium (Nd) fiber lasers having a Nd-doped core surrounded by a double-cladding and using the $^4F_{3/2}$ to $^4I_{9/2}$ transition of neodymium atoms to generate light of about 900 nm wavelength. Unfortunately, the 900 nm transition is three-level type and the neodymium atoms have a higher probability to emit light at roughly 1050–1070 nm where the transition is four-level type. The undesired light at 1050 nm easily dominates over the feeble 900 nm emission rendering the fiber laser or amplifier useless for most practical purposes.

Consequently, certain fiber devices such as fiber lasers and especially amplifiers, need to have a high loss at undesired long wavelengths. In the specific example of a Nd:glass laser or amplifier intended to emit or amplify light at 900 nm, it is necessary to obtain very high losses at 1050 nm. That is because the light at 900 nm is very feeble (it is 20 nm away from the peak of the emission at 880 nm), and the emission cross-section at 1050 nm is approximately 10 times the emission cross-section at 900 nm. Also, the light at 900 nm should be amplified, e.g., by 40 dB. Unfortunately, as the light at 900 nm is being amplified by 40 dB the light at 1050 nm is also amplified by 400 dB, thus completely dominating over the light at 900 nm. Clearly, light at 1050 nm needs to be attenuated by 400 dB or more to avoid this problem.

In addition, once about a kilowatt of power is being produced by the fiber laser or amplifier, even if it is just for a nanosecond or less, many nonlinear processes in addition to Raman scattering start interfering with generation of the useful light at 900 nm. These include phenomena such as Brillouin scattering, self-phase modulation as well as a host of other nonlinear optical mixing and conjugation processes via the third order nonlinear susceptibility $\chi^{(3)}$ of the fiber material. These effects limit the length of fiber which can be used in such fiber lasers or amplifiers. In fact, due to these effects the fiber length should be on the order of 1 m or even less. This means that light at 1050 has to be attenuated at an attenuation rate of about 400 dB/m.

In view of the above, it is clear that it would be desirable to selectively filter out unwanted wavelengths from a fiber laser or amplifier at a very high attenuation rate, e.g., 400 dB/m or more. This would be important for passive and active waveguides such as passive fibers, fiber lasers and fiber amplifiers.

In accordance with the prior art, waveguides are usually designed to prevent injected light from coupling out via mechanisms such as evanescent wave out-coupling (tunneling), scattering, bending losses and leaky-mode losses. A general study of these mechanisms can be found in the literature such as L. G. Cohen et al., "Radiating Leaky-Mode Losses in Single-Mode Lightguides with Depressed-Index Claddings", IEEE Journal of Quantum Electronics, Vol. QE-18, No. 10, October 1982, pp. 1467–72. In this reference the authors describe the propagation of light in more complex lightguides with claddings having a variation in the refractive index also referred to as double-clad fibers. They teach that varying the cladding profile can improve various quality parameters of the guided modes while simultaneously maintaining low losses. Moreover, they observe that depressed-index claddings produce high losses to the fundamental mode at long wavelengths. Further, they determine that W-profile fibers with high index core, low index inner cladding and intermediate index outer cladding have a certain cutoff wavelength above which fundamental mode losses from the core escalate. These losses do not produce very high attenuation rates and, in fact, the authors study the guiding behavior of the fiber near this cutoff wavelength to suggest ways of reducing losses.

U.S. Pat. Nos. 5,892,615 and 6,118,575 teach the use of W-profile fibers similar to those described by L. G. Cohen, or QC fibers to suppress unwanted frequencies and thus achieve higher output power in a cladding pumped laser. Such fibers naturally leak light at long wavelengths, as discussed above, and are more sensitive to bending than other fibers. In fact, when bent the curvature spoils the W or QC fiber's ability to guide light by total internal reflection. The longer the wavelength, the deeper its evanescent field penetrates out of the core of the fiber, and the more likely the light at that wavelength will be lost from the core of the bent fiber. Hence, bending the fiber cuts off the unpreferred lower frequencies (longer wavelengths), such as the Raman scattered wavelengths, at rates of hundreds of dB per meter.

Unfortunately, the bending of profiled fibers is not a very controllable and reproducible manner of achieving well-defined cutoff losses. To achieve a particular curvature the fiber has to be bent, e.g., by winding it around a spool at just the right radius. Different fibers manufactured at different times exhibit variation in their refractive index profiles as well as core and cladding thicknesses. Therefore, the right radius of curvature for the fibers will differ from fiber to fiber. Hence, this approach to obtaining high attenuation rates is not practical in manufacturing.

The prior art also teaches waveguides with complex cladding structures rather than stress-induced birefringence for polarization control. For example, U.S. Pat. No. 5,056,888 to Messerly et al. teaches a single-mode, single-polarization fiber with a generally elliptical W-profile. This radial profile distribution enables one to separate the orthogonal polarizations of light at a given wavelength. The separation occurs because light of one polarization will leak out of the core while light of the orthogonal polarization will not. Additional teaching on this subject can be found in Stolen et al., "Short W-Tunneling Fibre Polarizers", Electronics Letters, Vol. 24, 1988, pp. 524–525; U.S. Pat. No. 4,515,436 to Howard et al. and numerous other references. Unfortunately, such fiber waveguides can not achieve the necessary attenuation rates.

In view of the above, it would be an advance in the art to provide mass-producible wavelength filters having very high attenuation rates, e.g., 400 dB/m or more for undesired wavelengths longer that wavelengths of interest. Such wavelength filters should be adaptable to active and passive optical waveguides such as passive fibers, fiber lasers and fiber amplifiers. It would be an especially welcome advance to provide for precise tailoring of the filter properties without the need to bend or otherwise manipulate and adjust the waveguide or fiber after its production.

OBJECTS AND ADVANTAGES

In view of the above, it is a primary object of the present invention to provide a method for engineering optical wavelength filters for high losses in a manner that is reliable, reproducible and simple. The method should provide wavelength filters exhibiting losses of 400 dB/m and more at longer wavelengths, i.e., short pass filters, without the need for bending or otherwise manipulating or adjusting waveguides or fibers.

It is a further object of the invention to provide a method for wavelength filtering which can be employed in passive and active waveguiding devices, such as passive fibers, fiber lasers and fiber amplifiers.

It is yet another object of the invention to provide a method and filters for wavelength filtering which are compatible with nonlinear optical devices.

These and numerous other advantages of the present invention will become apparent upon reading the detailed description.

SUMMARY

The present invention provides an apparatus and a method for separating light of a first wavelength $\lambda_1$ from light of a second wavelength $\lambda_2$, where $\lambda_1 < \lambda_2$. The apparatus has a core exhibiting a certain core cross-section and having a refractive index $n_o$. The core is surrounded by a depressed cladding or cladding with a depressed index of refraction $n_1$. The depressed cladding has a depressed cladding cross-section and is itself surrounded by a secondary cladding which has a refractive index $n_2$ and a secondary cladding cross-section. The apparatus is designed in such a manner that a fundamental mode of light propagating within the core at the second wavelength $\lambda_2$ is lost or cut off. This is accomplished by selecting the core cross-section, the depressed cladding cross-section, the secondary cladding cross-section and the refractive indices $n_o$, $n_1$, $n_2$ to produce a fundamental mode cutoff wavelength $\lambda_c$ such that $\lambda_1 < \lambda_c < \lambda_2$. In practical applications, the refractive indices $n_o$, $n_1$, $n_2$ are values averaged over the corresponding cross-sections.

The sections of the core and claddings can be of any shape. For instance, they can all exhibit the same cylindrical symmetry. In some embodiments, however, cylindrical symmetry may not be appropriate and other symmetries can be selected. For example, in some embodiments the core can have an elliptical cross-section.

In accordance with the invention, the selection of the cross-sections and refractive indices determines the fundamental mode cutoff wavelength $\lambda_c$ as well as the losses incurred by wavelengths above the cutoff wavelength $\lambda_c$. Specifically, these choices determine the losses incurred by light at second wavelength $\lambda_2$. In some embodiments, the selection is performed such as to produce a loss of at least 100 dB/m at the second wavelength $\lambda_2$. In some embodiments requiring very high losses to the second wavelength, the selection of the cross-sections and indices can be made such that the losses at the second wavelength $\lambda_2$ are at least 400 dB/m.

The selection rules for the sections and indices are derived from the Maxwell equations. More specifically, however, it may be convenient to select the refractive indices such that:

$$\sqrt{(n_2^2 - n_1^2)/(n_o^2 - n_1^2)} \geq 0.224.$$

In another embodiment, it may also be convenient to select the refractive indices such that:

$$\sqrt{(n_2^2 - n_1^2)/(n_o^2 - n_1^2)} \geq 3.$$

When the core has a section radius $r_0$, and the depressed cladding section has an outer radius $r_1$, it may also be convenient to select the refractive indices such that:

$$\frac{r_1}{r_o} \geq 1 + \sqrt{(n_o^2 - n_2^2)/(n_2^2 - n_1^2)}.$$

The apparatus can have a core with an optically active material at the first wavelength $\lambda_1$. For example, the optically active material is a nonlinear optical material or a gain medium having a first gain at $\lambda_1$. In some cases the apparatus can be further equipped with an optical feedback to the gain medium thereby creating a laser emitting at $\lambda_1$. Such laser can be further equipped with a secondary cladding surrounding the outer cladding and a pump source optically coupled to the secondary cladding for supplying pump light to the core. Without the feedback the apparatus can act as an optical amplifier for amplifying light at $\lambda_1$. In another embodiment, the apparatus acts as a broadband amplified spontaneous emission source of light near $\lambda_1$.

Whether the apparatus is set up as a laser or amplifier, the core frequently has a second gain at second wavelength $\lambda_2$.

In this case the cross-sections and indices of refraction are selected to produce loss at the second wavelength $\lambda_2$ at least equal to the second gain. Preferably, the loss at $\lambda_2$ is at least equal to 100 dB/m or even 400 dB/m or more.

The gain medium can have at least one rare earth element selected from the group consisting of Neodymium, Ytterbium, Erbium, Thulmium and Holmium. In a preferred embodiment, when Erbium is used as the gain medium and the apparatus functions as an optical amplifier at $\lambda_1$, the cut-off wavelength $\lambda_c$ can be set in the middle, or toward the long wavelength end, of the S-band. This configuration is particularly useful for telecommunications applications.

In some embodiments the core will have an optically active material producing light at $\lambda_2$ or having second gain at $\lambda_2$. In some cases the optically active material may also exhibit a third gain at a third wavelength $\lambda_3$, where $\lambda_c < \lambda_3$. In such devices both $\lambda_2$ and $\lambda_3$ are filtered out of the core. This situation is encountered, for example, when the second gain is due to stimulated emission of the optically active material or gain medium at $\lambda_2$ and the third gain is due to stimulated Raman scattering of light at $\lambda_1$.

In accordance with yet another embodiment of the invention, the apparatus can be rendered polarization-selective. For example, the light at $\lambda_1$ may have a first polarization and a second polarization orthogonal to the first polarization. One or more of the cross sections and refractive indices are further adjusted in this embodiment such that $\lambda_1 < \lambda_c$ for the first polarization and $\lambda_1 > \lambda_c$ for the second polarization. In other words, the first polarization at $\lambda_1$ is cut off from the core along with wavelength $\lambda_2$. In this same or another embodiment the core, depressed cladding and outer cladding can form a polarization maintaining fiber.

The invention also provides a method for separating light of first wavelength $\lambda_1$ from light of second wavelength $\lambda_2$, where $\lambda_1 < \lambda_2$. This is done by engineering the cross-sections of the core, depressed cladding and secondary cladding as well as their refractive indices to ensure that the fundamental cutoff wavelength $\lambda_c$ to the fundamental mode of light at these wavelengths is such that $\lambda_1 < \lambda_c < \lambda_2$. The losses to $\lambda_2$ are adjusted to 100 dB/m or even 400 dB/m or more by appropriate choice of the cross-sections and refractive indices.

Optionally, the secondary cladding can be surrounded by an outer cladding, and can be optically coupled to a pump source for guiding pump light that excites the gain medium in the core. This method is particularly advantageous when the method is applied to a fiber amplifier or a fiber laser with optical feedback to the gain medium.

In situations where a particular polarization of light at $\lambda_1$ has to be cut off along with $\lambda_2$, the method further provides for adjusting the cross-sections and/or indices of refraction. Furthermore, in those situations stress can be applied to render the core and/or depressed cladding polarization selective.

A detailed description of the invention and the preferred and alternative embodiments is presented below in reference to the attached drawing figures.

DETAILED DESCRIPTION

Figure 1:
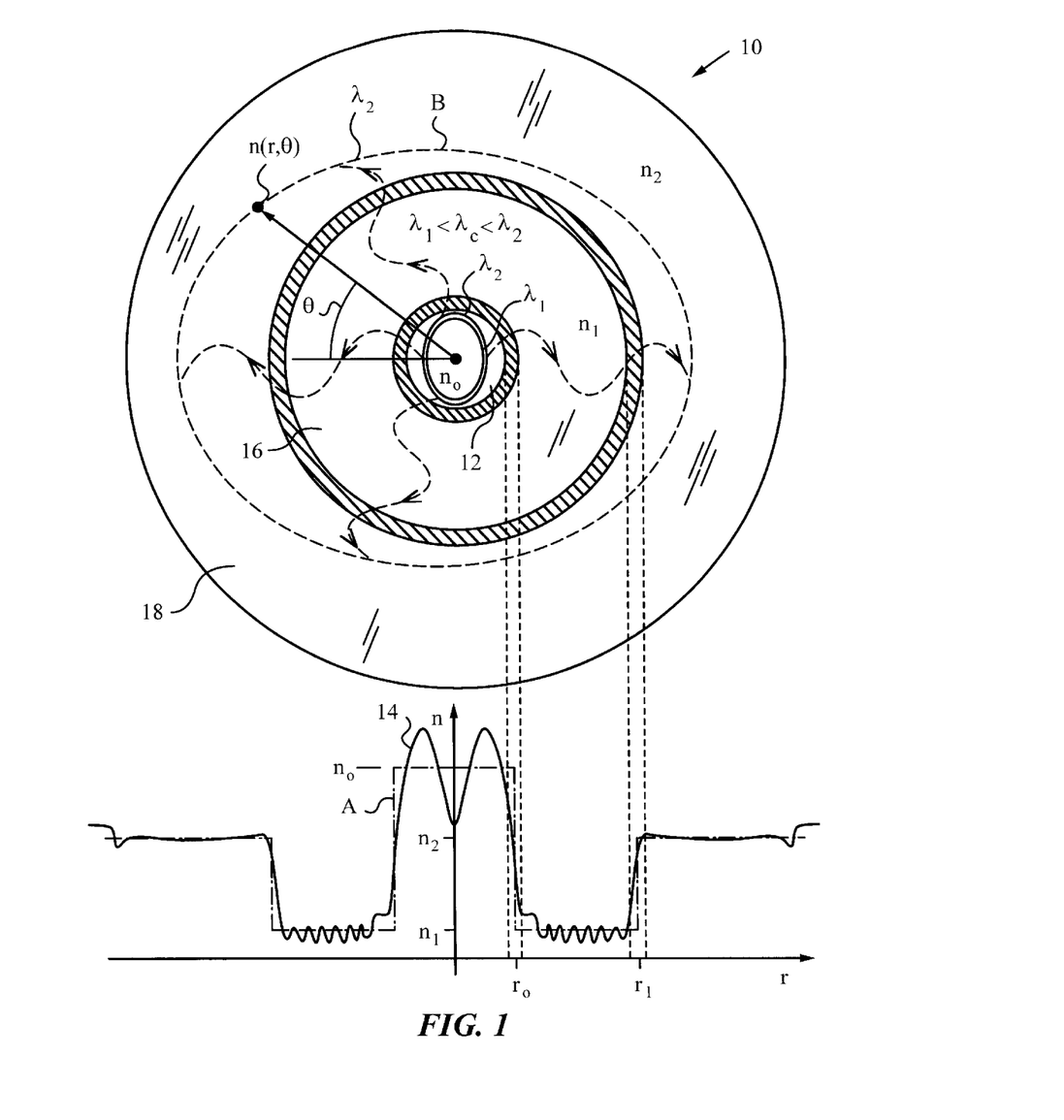
FIG. 1 is a cross-sectional view and a generalized index profile of a W-fiber of the present invention.

The invention will be best understood by first reviewing some construction and engineering principles with reference to FIG. 1. The cross-sectional view of this drawing illustrates an apparatus 10 in the form of an optical fiber having a core 12 exhibiting a cylindrical core cross-section. A region I associated with core 12 extends from $0 \leq r \leq r_0$ as indicated on the r-axis in graph 14. In fact, graph 14 illustrates the refractive index profile of apparatus 10, according to which core 12 has an average refractive index n, in a region I or from r=0 to r=$r_o$. Theoretically, the value of refractive index within core 12 is preferably constant with radius r and polar angle θ. This theoretical profile is indicated by a dashed and dotted line A. In practice, because of present day manufacturing processes the refractive index profile in region I exhibits the radial variation visualized by graph 14. For the purposes of the invention it is sufficient, however, that the radially varying index of core 12 have an average value equal to $n_o$.

Core 12 is surrounded by a depressed cladding 16 having a depressed cladding cross-section which is also cylindrically symmetric. Depressed cladding 16 extends from $r_o \leq r \leq r_1$ and occupies a region II. In turn, depressed cladding 16 is surrounded by a cylindrically symmetric secondary cladding 18. Secondary cladding 16 occupies a region III extending from $r \geq r_1$.

As is apparent from graph 14, depressed cladding 16 is chosen to have a lower average refractive index $n_1$ than average refractive index $n_o$ of core 12 and an average refractive index $n_2$ of secondary cladding 18. Once again, the average refractive index values are indicated by dashed and dotted line A, while the actual refractive index profile obtained by a typical manufacturing process is indicated by graph 14. The hatched areas in fiber 10 indicate the interface areas where the value of the refractive index transitions between the average values in regions I, II and III. The refractive index profile of graph 14 resembles the letter W (as more clearly seen from the theoretical profile indicated by line A.) Hence, fiber 10 is often referred to as a W-fiber or a fiber with a W-profile. Once again, for the purposes of the invention it is sufficient that the radially varying index have average values of $n_o$ and $n_2$ in regions II and III associated with depressed cladding 16 and secondary cladding 18 respectively. It should be noted that an optional outer cladding (not shown) surrounding secondary cladding 14 may also be present. Such outer cladding can be used to couple a pump source into fiber 10 for purposes explained below.

In accordance with the invention, the W-profile illustrated in graph 14 is engineered to ensure that light at a first wavelength $\lambda_1$ propagates in core 12 via total internal reflection. At the same time, light at a second wavelength $\lambda_2$ longer than $\lambda_1$ ($\lambda_1 < \lambda_2$) is lost or cut off from core 12 at a high loss or attenuation rate. More specifically, the W-profile is engineered to have a fundamental mode cutoff wavelength $\lambda_c$ such that light in the fundamental mode at $\lambda_1$ is retained in core 12 while light in fundamental mode at $\lambda_2$ is lost to secondary cladding 18 over a short distance, as indicated by dashed line B. This objective is accomplished by appropriately engineering the W-profile rather than bending fiber 10 or performing other mechanical adjustments.

Cutoff wavelength $\lambda_c$ of W-fiber 10 is a wavelength at which the fundamental mode (the $LP_{01}$ mode) abruptly transitions from low-loss to high loss in core 12, i.e., is cut off from core 12. The cutoff wavelength $\lambda_c$ is chosen between wavelength $\lambda_1$ which is desired, and wavelength $\lambda_2$ that is not desired, i.e., $\lambda_1 < \lambda_c < \lambda_2$.

In principle, to determine a cutoff wavelength $\lambda_c$ of a W-fiber, the selection rules for cross-sections and refractive indices $n_o$, $n_1$ and $n_2$ of W-fiber 10 are derived from Maxwell's equations. In the weak guiding approximation (which is valid when the indices of refraction of core 12 and claddings 16, 18 are all relatively close to each other), the Maxwell vector equations can be replaced with a scalar equation. The scalar $\psi$ represents the strength of the transverse electric field in the fiber. For more information, see for example G. Agrawal, *Nonlinear Fiber Optics* (Academic, San Diego, 1995), D. Marcuse, *Light Transmission Optics* (Van Nostrand, Princeton, 1972), and D. Marcuse, *Theory of Dielectric Optical Waveguides* (Academic, New York, 1974).

For convenience, let us define the following parameters:

$$u_0 = \sqrt{n_o^2 - n_2^2} \text{ and } u_1 = \sqrt{n_2^2 - n_1^2} \quad (1)$$

The scalar field $\psi$ inside the fiber satisfies a wave equation whose solutions are Bessel functions and modified Bessel functions. For the fundamental mode supported by fiber 10, inside core 12 is thus:

$$\psi = J_0(\kappa r), 0 \leq r \leq r_0 \text{ (region I)} \quad (2)$$

where $\kappa$ is an eigenvalue that needs to be determined, and $J_0$ is the zeroth Bessel's function.

Inside depressed cladding 16, the scalar field $\psi$ is:

$$\psi = A K_0(\beta r) + B I_0(\beta r), r_0 \leq r \leq r_1 \text{ (region II)} \quad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the light.

In secondary cladding 18, we obtain:

$$\psi = C K_0(\gamma r), r \geq r_1 \text{ (region III)} \quad (4)$$

Here C is another constant, and $\gamma^2 = u_0^2(2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma = 0$. (See for example, Cohen et al., IEEE J. Quant. Electron. QE-18 (1982) 1467–1472.)

For additional convenience, let us define the following parameters:

$$x = \frac{2\pi u_0 r_0}{\lambda_c}, \rho = u_1/u_0, s = r_1/r_0. \quad (5)$$

Now, cutoff wavelength $\lambda_c$ can be determined if parameter x is determined. That determination can be made with the aid of algebra known to a person skilled in the art, since parameter x is the root of the following equation:

$$\rho J_0(x) K_1(\rho x) I_1(\rho s x) - \rho J_0(x) I_1(\rho x) K_1(\rho s x) - \quad (6)$$
$$J_1(x) K_1(\rho s x) I_0(\rho x) - J_1(x) I_1(\rho s x) K_0(\rho x) = 0.$$

Some solutions of Eq. (6) are graphed in FIG. 2, which shows x as a function of the ratio s, for various values of the parameter $\rho$.

Three observations should be made regarding the parameter x. First, x does not exist for all values of s and $\rho$. For example, for $\rho = 1$ and $S \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \quad (7)$$

Second, for practical applications x cannot be too small. This is because, according to Eq. (5), the parameter x is proportional to radius $r_0$ of core 12, and the radius has to be large enough that it is easy to couple light into and out of core 12. (A smaller core 12 also makes the nonlinear effects stronger, which is often a disadvantage.) Radius $r_0$ of core 12 is preferably 2 $\mu$m or larger. Typical values of $u_0$ and $\lambda_c$ are 0.1 and 1 $\mu$m, respectively. Therefore, since $x = 2\pi u_0 r_0/\lambda_c$, preferably $x \geq 1$. This implies that $\rho \geq 0.224$ or, in terms of the refractive indices $\sqrt{(n_2^2 - n_1^2)/(n_o^2 - n_2^2)} \geq 2.224$.

Figure 2:
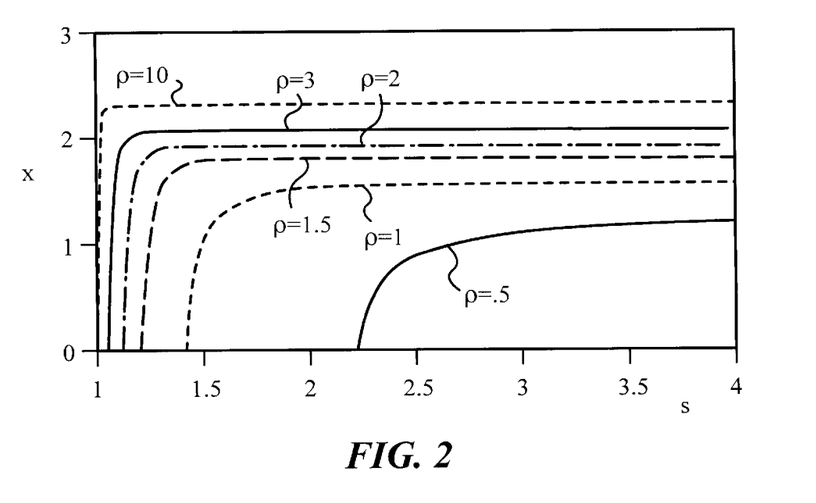
FIG. 2 is a graph illustrating x as a function of the ratio s for various values of the parameter ρ.

Third, it is evident from FIG. 2 that for larger values of s, the value of x only weakly depends on s. Thus it is advantageous to have a fiber in this region of parameter space, since a manufacturing flaw producing an error in s will have a small effect on the value of cutoff wavelength $\lambda_c$. Therefore, it is convenient to use the rule $s \geq 1 + 1/\rho$, or in terms of the refractive indices:

$$\frac{r_1}{r_o} \geq 1 + \sqrt{(n_o^2 - n_2^2)/(n_2^2 - n_1^2)}. \quad (8)$$

The selection of cross sections and refractive indices of core 12, depressed cladding 16 and outer cladding 18 is guided by the above rules in setting the appropriate fundamental mode cutoff wavelength $\lambda_c$. First, $\lambda_c$ is selected such that $\lambda_1 < \lambda_c < \lambda_2$ and then convenient values are selected for $u_o$ and $r_o$. Based on these choices x is computed from equation 5, and conveniently $x \geq 1$ (otherwise the previous choices can be adjusted). Then, suitable values of s and $\rho$ are found using equation 6. A range of values for $\rho$ and s will yield desired $\lambda_c$. Typically, all values of $\rho$ are larger than 0.224. In addition, the rule of equation 8 is used to further narrow the range of suitable values of $\rho$ and s.

Finally, the values of s and $\rho$ have an additional limitation. Namely, they must be selected so that core 12 of fiber 10 has a great enough loss, e.g., 100 dB/m or even 400 dB/m or more at the undesired wavelength $\lambda_2$. To find the loss at $\lambda_2$, the fiber modes for light having wavelength $\lambda > \lambda_c$ are required.

Equations (2), (3), and (4) specify the fundamental mode when $\lambda < \lambda_c$. When $\lambda > \lambda_c$, the function $\psi$ is oscillatory, rather than exponentially decaying, in secondary cladding 18. Therefore when $\lambda > \lambda_c$, Eq. (4) is replaced by:

$$\psi = C J_0(qr) + D N_0(qr), r \geq r_1 \text{ (region III)} \quad (9)$$

where $N_0$ (also called $Y_0$) is the zeroth Neumann function, $q^2 = \kappa^2 - u_0^2(2\pi/\lambda)^2$, and C and D are constants to be determined.

There are two key items to note regarding the modes for $\lambda > \lambda_c$. First, there are five unknowns (A, B, C, D, and $\kappa$) and four boundary conditions (continuity of $\psi$ and $d\psi/dr$ at $r_0$ and $r_1$). The equations are underconstrained: $\kappa$ may be chosen to be any value between 0 and $(2\pi/\lambda)\sqrt{u_0^2+u_1^2}$. Thus, there is a continuum of states for each $\lambda > \lambda_c$, corresponding to the continuum of values that 78 may have. This situation is quite different from the case $\lambda < \lambda_c$, where four unknowns (A, B, C, and $\kappa$) are fixed by the four boundary conditions, resulting in $\kappa$ being a discrete eigenvalue having a unique value at each $\lambda$.

Second, the modes specified by Eqs. (2), (3), and (9) are eigenmodes of the W-fiber; however, these modes do not correspond to the situation that is physically realized. This is a result of Eq. (9) containing both incoming and outgoing waves, whereas in practice only outgoing waves are present (the light at wavelength $\lambda_2$ originally propagating in core 12 radiates out).

Nevertheless, the modes of Eqs. (2), (3), and (9) can be used to estimate the loss at wavelengths greater than $\lambda_c$. First, for a given wavelength $\lambda$, find the value of $\kappa$ that minimizes $C^2+D^2$. This corresponds to the mode that is the most long-lived within the core. (An analogy can be made between the wave equation for the scalar $\psi$ in the fiber and the quantum mechanical wave equation for a particle in a potential well. Then the quantum mechanical results can be borrowed. See for example David Bohm, *Quantum Theory*, Dover 1989, Chapter 12 §14–22.)

Second, once $\kappa$ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber 10 is described by the equation:

$$\frac{dP}{dz} = -\Lambda P. \quad (10)$$

The loss is given by the coefficient $\Lambda$, which is approximately:

$$\Lambda = \frac{\lambda}{4\pi^2 n_0} \frac{C^2 + D^2}{\int_0^{r_0} r\, dr\, \psi * \psi}. \quad (11)$$

The loss $\Lambda$, having units of $m^{-1}$, can be converted to a loss $\beta$ in units dB/m, using the relation:

$$\beta = 10 \log_{10}(e) \cdot \Lambda. \quad (12)$$

Here the term "loss" refers to radiation that leaks out of core 12 into secondary cladding 18. In fact, the radiation may not be truly lost from fiber 10 itself, if it remains in secondary cladding 18. In some cases this will be sufficient. In other cases light from secondary cladding 18 can be out-coupled, as necessary.

Figure 3:
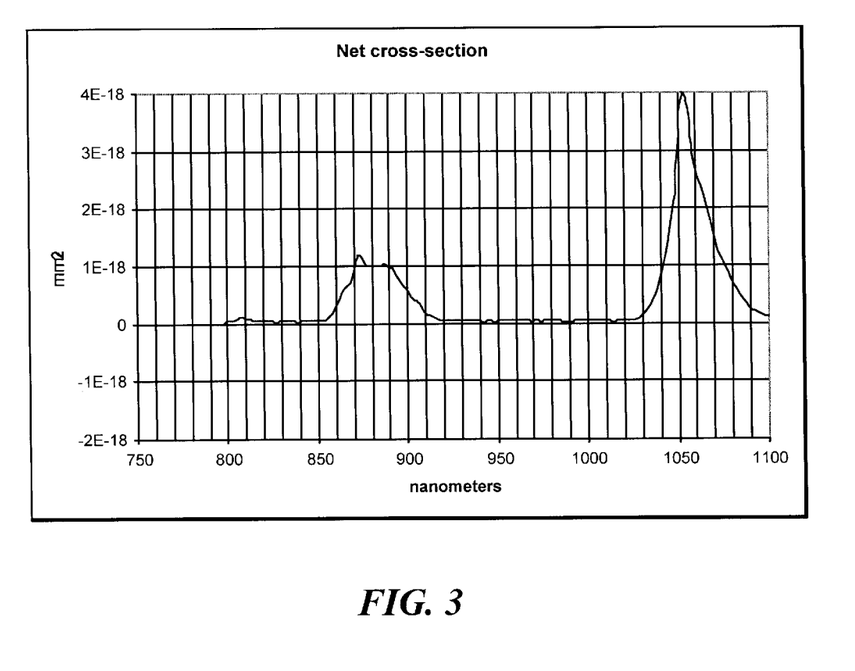
FIG. 3 is a graph illustrating the emission cross section of neodymium-doped glass as a function of wavelength.

The way in which fiber 10, constructed in accordance with the invention, can be used to filter out wavelength $\lambda_2$ will be understood by studying a specific example. For this purpose, FIG. 3 shows a graph of the emission cross-section of neodymium-doped glass (or Nd:glass) as a function of wavelength, which is present in core 12. The desired wavelength $\lambda_1$ to be retained in core 12 is around 880 nm and the undesired wavelength $\lambda_2$ to be cut off from core 12 is approximately 1050 nm. In practice wavelength of 900 nm is preferred as $\lambda_1$ because it requires less pump intensity to achieve net gain. However, the emission strength at 900 nm is down and there is a competing transition, peaked around 1050 nm. The Nd:glass shows preference toward emitting light at 1050 nm rather than at 900 nm, as discussed in the background section. Therefore, it is desirable to have a loss of about 400 dB/m or more at 1050 nm, but (when pumped) a gain of about 40 dB/m at 900 nm.

Figure 4:
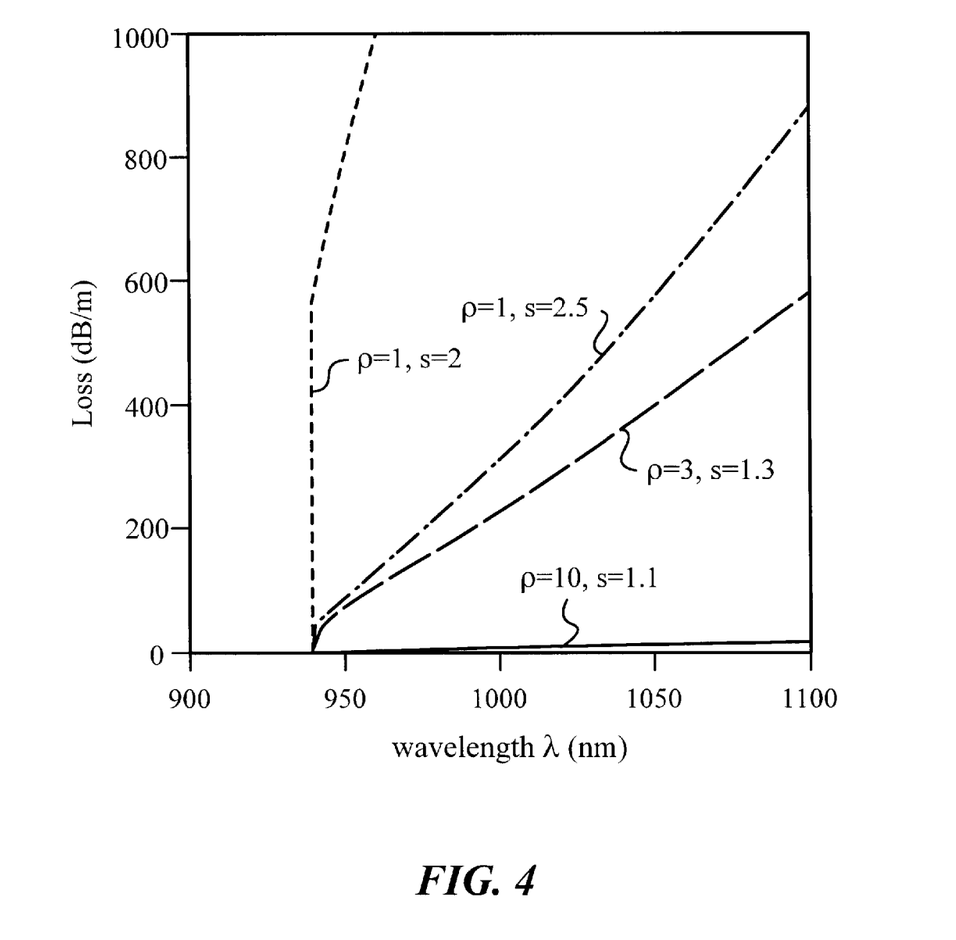
FIG. 4 is a graph illustrating loss as a function of wavelength for various W fibers.

FIG. 4 shows a graph of loss vs. wavelength for various values of the parameters $\rho$ and s. In each case, fundamental mode cutoff wavelength $\lambda_c$ is 940 nm in agreement with the requirement that that $\lambda_1 < \lambda_c < \lambda_2$. The requirements are that the loss at 1050 nm be at least approximately 400 dB/m, and the loss at 900 nm be zero. Referring to FIG. 4, it can be seen that to satisfy these requirements, as well as keep the inequality of Eq. (7), $s \geq 1+1/\rho$, the parameter $\rho$ must be less than or equal to approximately 3, or in terms of refractive indices $\sqrt{(n_2^2-n_1^2)/(n_0^2-n_2^2)} \leq 3$. In the present example more than 400 dB/m loss is given by $\rho=1$ and $s=2$.

Another method for calculating the loss involves calculating the complex propagation constant of the leaky fundamental mode of W-fiber 10. Leaky modes are discussed in, for example, D. Marcuse, *Theory of Dielectric Optical Waveguides* (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given W-fiber, rather than use the Bessel function approach outlined above, since real fibers do not have the idealized step index profile indicated be line A shown in FIG. 1, but have variations from the ideal as shown by graph 14 of the refractive index profile. In particular, the most common method of single-mode fiber manufacture today involves the MOCVD process, which typically leaves an index dip in the center of the core. Numerical solutions can, more easily than the method described above, take into account the actual variations in refractive index as a function of radius. Such numerical calculations can again give cutoff wavelength $\lambda_c$ and fiber loss as a function of fiber parameters including cross-sections and refractive indices, allowing W-fiber 10 to be designed to exhibit the desired features.

When Eq. (11) is used to estimate the loss, refractive indices $n_0$, $n_1$, and $n_2$ will in general be average indices of refraction, since the actual indices of refraction will vary somewhat as a function of radius.

The index of refraction n is not necessarily radially symmetric. If the cross section of fiber 10 is described by polar coordinates r and $\theta$ (e.g., see FIG. 1) the refractive index may depend upon the angle $\theta$ as well as the radius r. Thus, $n=n(r,\theta)$. Such an asymmetric fiber may be desirable for polarization maintenance, for example.

Here is the prerequisite for the fiber to have cutoff wavelength $\lambda_c$. Let R be a radius large enough that the index at radius R has substantially leveled off to the value $n_2$. Then fiber 10 will have cutoff wavelength $\lambda_c$ if (see B. Simon, Ann. Phys. 97 (1976), pp. 279):

$$\int_0^{2\pi} d\theta \int_0^R r\, dr (n^2(r,\theta) - n_2^2) \leq 0. \quad (13)$$

Note that given the profile of FIG. 1, Eq. (13) becomes:

$$\pi r_0^2 u_0^2 - \pi(r_1^2 - r_0^2) u_1^2 \leq 0, \quad (14)$$

which is equivalent to Eq. (7) above.

Cutoff wavelength $\lambda_c$ is the largest wavelength for which there is an eigenmode that is localized in region I. The loss for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating loss. In general, fiber 10 with a desired cutoff wavelength $\lambda_c$ and loss can therefore be designed by adjusting the profile n(r,θ), which is equivalent to adjusting the cross-sections and refractive indices of core 12, depressed cladding 16 and secondary cladding 18.

The above discussed principles of invention can be applied to make W-fibers of the type depicted in FIG. 1. The W-fibers of the invention can be used in optical filters (short-pass filters), optical amplifiers, lasers, or nonlinear optical switches.

Figure 5:
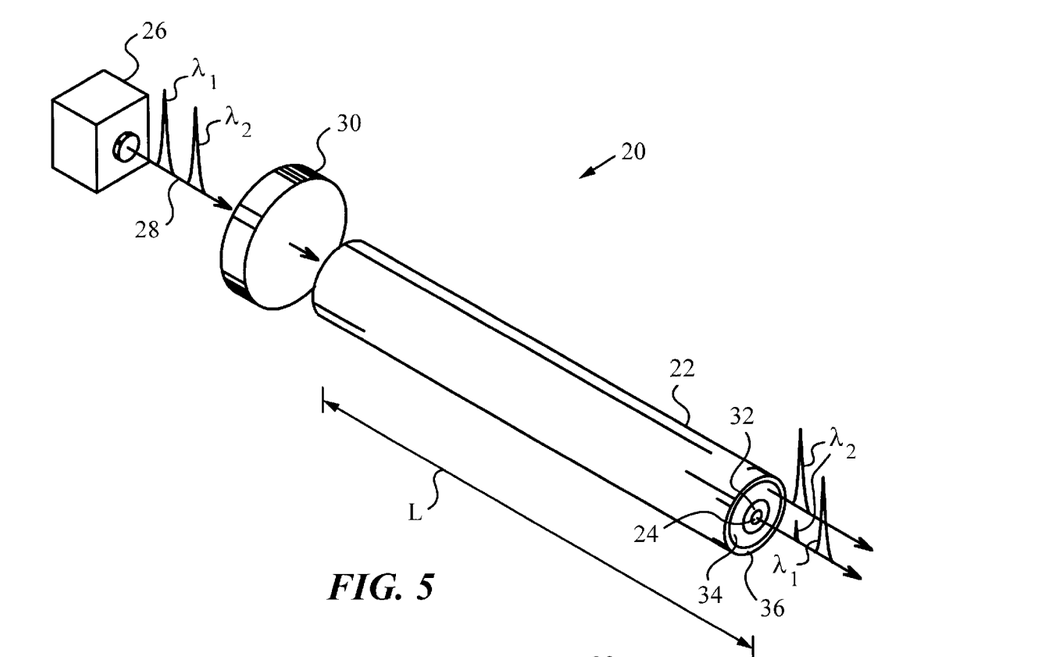
FIG. 5 is an isometric view of an optical system having the W-fiber acting as an optical filter.

Optical filters such as specialty glass, fiber Bragg gratings, arrayed waveguide routers and dichroic mirrors are frequently used in optics to transmit one wavelength and attenuate or divert another. FIG. 5 is an isometric view of an optical system 20 according to the invention, equipped with a W-fiber 20 acting as a fiber-optic filter to transmit a first wavelength $\lambda_1$ and attenuate a longer, undesired second wavelength $\lambda_2$. Device 20 is passive, since a core 24 does not contain any optically active materials and there is no gain at either $\lambda_1$ or $\lambda_2$ in fiber 22.

The optical system 20 has a light source 26 delivering light 28 containing first wavelength $\lambda_1$ and second wavelength $\lambda_2$ to be filtered out at a high loss, i.e., over a short distance L. An optical coupler 30, in this case a lens is used to in-couple light 28 into core 24 of W-fiber 22.

Figure 6A:
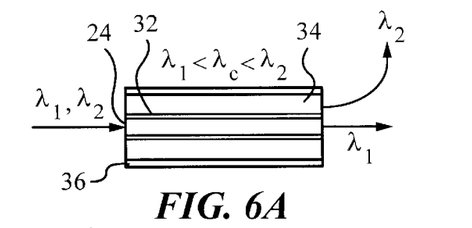
FIG. 6A is a cross-sectional side view of the W-fiber of FIG. 5.

Fiber 22 has a depressed cladding 32 surrounding core 24, and a secondary cladding 34 surrounding depressed cladding 32. A jacket 36 is also provided for protecting fiber 20 from external influences. The cross-sections of core 24 and claddings 32, 34 are cylindrically symmetric. The parameters of fiber 20 are represented by refractive indices $n_0$, $n_1$, $n_2$ of core 24 and claddings 32, 34 respectively as well as radii $r_o$ and $r_1$. These parameters are selected in accordance with the invention to produce fundamental mode cutoff wavelength $\lambda_c$ in core 24 at a suitable spacing from wavelength $\lambda_1$ and wavelength $\lambda_2$ such that $\lambda_1 < \lambda_c < \lambda_2$, and to produce a desired loss at the wavelength $\lambda_2$. Hence, after propagating a distance L through fiber 22, most of light 28 at $\lambda_2$ is cut off from core 24 and passes into secondary cladding 34, as shown. In this embodiment 100 dB/m or less can be a sufficient loss at $\lambda_2$. For better visualization, FIG. 6A shows a cross-sectional side view of the W-fiber 22 of the optical system 20 shown in FIG. 5.

Figure 6B:
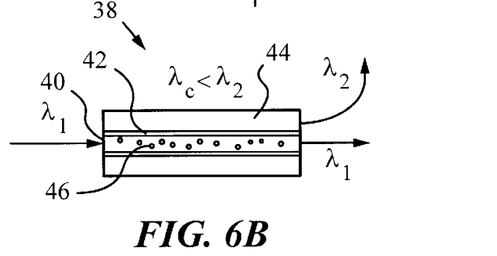
FIGS. 6B–E are cross sectional side views of W-fibers for various applications in accordance with the invention.

In an embodiment shown in side cross-section in FIG. 6B a W-fiber 38 having a core 40, a depressed cladding 42 and a secondary cladding 44 is engineered to act as an optical amplifier. Core 40 of fiber 38 has an optically active material 46 such as an appropriate gain medium. For example, gain medium 46 can be a rare earth element, such as Neodymium, Ytterbium, Erbium, Thulmium or Holmium or a combination of these elements for producing first gain at first wavelength $\lambda_1$ in order to amplify it. As shown in FIG. 3B, light at wavelength $\lambda_1$ is coupled into core 40 of W-fiber 38. Pump light (not shown) is coupled into core 40 to activate optically active material 46. Optically active material 46 inside core 40 also exhibits a second gain at undesired wavelength $\lambda_2$, e.g., by a nonlinear scattering process such as stimulated Raman scattering, such that $\lambda_1 < \lambda_2$. Since only $\lambda_1$ is to be amplified, light generated due to gain at $\lambda_2$ is undesired. Thus, in accordance with the invention, the parameters of fiber 38 are selected to produce a fundametal mode cutoff wavelength $\lambda_c$ between $\lambda_1$ and $\lambda_2$ within core 40 (i.e., $\lambda_1 < \lambda_c < \lambda_2$) and produce a desired loss at $\lambda_2$. In this embodiment a loss of 100 dB/m or more may be desirable.

Figure 6C:
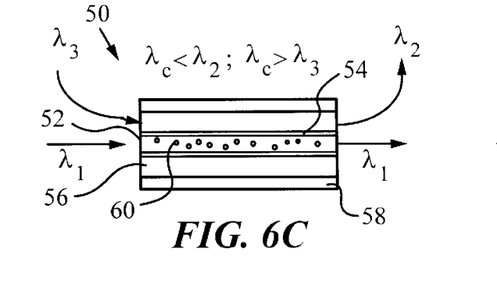

FIG. 6C shows a W-fiber 50 with a core 52, a depressed cladding 54 and a secondary cladding 56 in accordance with the invention. Additionally, an outer cladding 58 having a refractive index $n_3$, where $n_3 < n_2$, surrounds secondary cladding 56. The parameters of fiber 50 are selected to produce a fundametal mode cutoff wavelength $\lambda_c$ with $\lambda_1 < \lambda_c < \lambda_2$. Light at a pump wavelength $\lambda_3$ is in-coupled into fiber 50 through secondary cladding 56. Light at $\lambda_3$ is used to stimulate emission at $\lambda_1$ within core 52. Typically $\lambda_3 < \lambda_c$ so as to efficiently in-couple into or criss-cross core 52.

Core 52 contains a rare earth gain material 60 which exhibits a first gain at desired wavelength $\lambda_1$ and a second gain at undesired wavelength $\lambda_2$. Thus, fiber 50 is engineered in accordance with the invention to have a loss at $\lambda_2$ that is large enough that the gain at $\lambda_2$ due to the rare earth atoms of material 60 does not overpower the signal at $\lambda_1$. In particular, it is preferable that the loss at $\lambda_2$ be greater than or equal to the gain at $\lambda_2$. In some cases, the loss at $\lambda_2$ is required to be greater than or equal to 100 dB/m. In some cases requiring very high losses, the loss at $\lambda_2$ is required to be greater than or equal to 400 dB/m. Fiber 50 can be used as an efficient optical amplifier of light at $\lambda_1$.

Figure 6D:
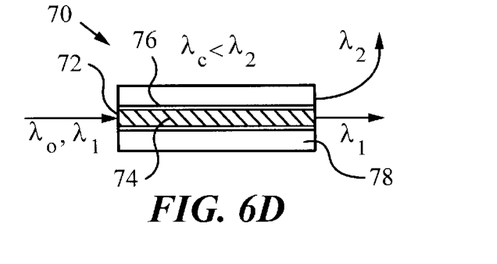
Figure 6E:
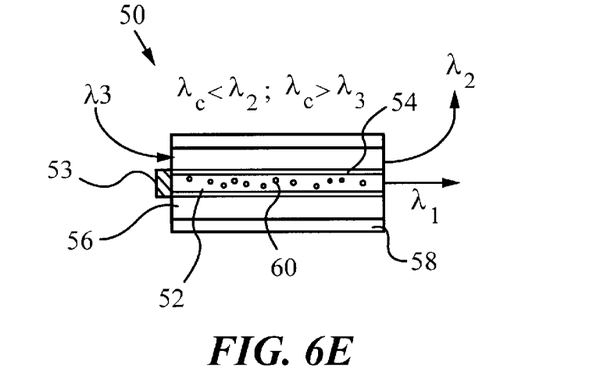

In fact, optical amplifier 50 of FIG. 6C can be easily transformed into a fiber laser, as shown in FIG. 6E. For this purpose an optical feedback element 53, in this case a mirror, is provided to provide optical feedback to gain medium 60 in core 54. Additional mirrors or other feedback elements well-known in the art can be used to set up an appropriate laser cavity within fiber 50 around gain medium 60.

Figure 7A:
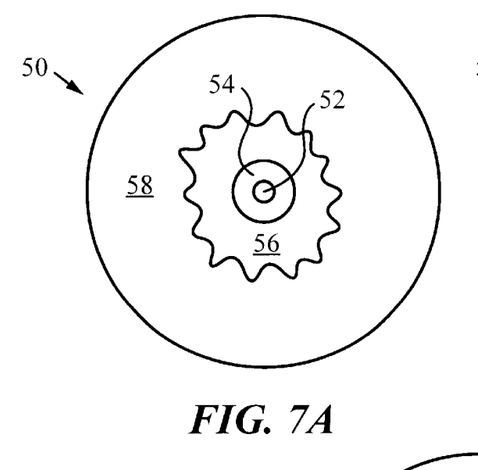
FIGS. 7A–B are cross sectional views illustrating exemplary shapes of secondary claddings of W-fibers.
Figure 7B:
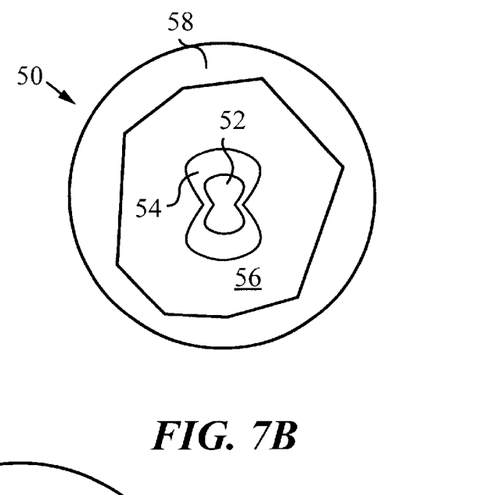

Two alternative cross-sections of fiber 50 are illustrated in FIGS. 7A–B. In these embodiments secondary cladding 56 has a non-circular cross-section to ensure that light at $\lambda_3$ is efficiently guided to criss cross core 52. In these two examples secondary cladding 56 has a flower shape and an irregular polygon shape. A person skilled in the art will recognize that other shapes can also be implemented for this purpose. Additionally, in FIG. 7B cross-sections of core 52 and depressed cladding 54 do not exhibit cylindrical symmetry. As is known in the art, the application of stress or appropriate manufacturing techniques can be employed to achieve such cross-sections. These cross sections are useful for rendering fiber 50 polarization selective.

Following are examples illustrating specific uses of fiber 50 as an optical amplifier.

EXAMPLE 1

Neodymium Doped Fiber Amplifier

The amplifier includes the W-fiber having a core, a depressed cladding, and a secondary cladding, as described above. In addition, the core is doped with Neodymium ions (on the order of $10^{20}$ ions per $cm^3$, for example), and the secondary cladding is surrounded by an outer cladding having a refractive index $n_3$, where $n_3 < n_2$. The secondary cladding is used for guiding pump light that excites the Nd atoms. The secondary cladding typically has a mean diameter between 40 μm and 80 μm.

The secondary cladding is optically coupled to laser diodes having a wavelength in the vicinity of 808 nm. The light from these diodes creates gain in the core, both near 900 nm and near 1050 nm. Light near 900 nm is input into the core and is to be amplified. Light at 1050 nm is generated by the four level transition of Nd atoms and is undesired. As an example, the light to be amplified has a wavelength of 914 nm, corresponding to light from a laser comprising a Neodymium-doped Yttrium vanadate crystal.

Thus, in this example, $\lambda_1$=914 nm and $\lambda_2$=1050 nm. The indices of refraction $n_0$, $n_1$, and $n_2$ and the radii $r_0$ and $r_1$ are selected to give a cutoff wavelength $\lambda_c$ between $\lambda_1$ and $\lambda_2$. As an example, $r_0$=3 μm and $r_1$=6 μm. The secondary cladding is fused silica having $n_2$=1.458. The outer cladding is a polymer cladding. The core is characterized by $n_0-n_2$= 0.0022, and the depressed cladding has index $n_1$ given by $n_2-n_1$=0.0022. Accordingly, $\rho \approx 1$ and s=2. From Eq. (6), x=1.549, corresponding to a cutoff wavelength of $\lambda_c$~975 nm. The loss at $\lambda_2$ is approximately 1400 dB/m.

EXAMPLE 2

Ytterbium Doped Fiber Amplifier

This example is similar to the Neodymium doped fiber amplifier described in Example 1. The secondary cladding again becomes a pump cladding. The core is doped with Ytterbium atoms. When pumped with 920 nm light, the Ytterbium exhibits gain both at 980 nm and at approximately 1050 nm. In this example, $\lambda_1$=980 nm and $\lambda_2$=1050 nm. The W-fiber parameters are adjusted as explained above to give a cutoff wavelength $\lambda_c$ between 980 nm and 1050 nm, with a suitable loss at 1050 nm.

FIG. 6D shows a W-fiber 70 acting as an optical amplifier using the Raman effect. Light at wavelengths $\lambda_0$ and $\lambda_1$ is coupled into a core 72 of W-fiber 70. Core 72 contains an optically active material 74. In this case, optically active material 74 is the silica of fiber 70 itself. Core 72 is further surrounded by depressed cladding 76 and secondary core 78.

In a Raman scattering event, a photon at wavelength $\lambda_0$ is absorbed and a photon at wavelength $\lambda_1$ is simultaneouly emitted. The difference between the energies of the incoming and outgoing photons is left behind as a molecular vibrational excitation. The Raman process has a gain, which means that the probability of a Raman event taking place is proportional both to the intensity of incoming light at wavelength $\lambda_0$ and to the intensity light at the emitted wavelength $\lambda_1$. A fiber Raman amplifier takes advantage of the Raman effect in glass, where the energy shift due to the Raman effect is typically about 440 cm$^{-1}$. Pump light at wavelength $\lambda_0$ and signal light at wavelength $\lambda_1$ propagate in fiber 70, where the pump light photons have approximately 440 cm$^{-1}$ greater energy than the signal light photons. The Raman effect then converts pump light at $\lambda_0$ to signal light, thereby amplifying light at $\lambda_1$.

However, the signal light itself can be further downgraded to another wavelength $\lambda_2$ by the Raman effect, where the difference in energy between $\lambda_1$ and $\lambda_2$ is again approximately 440 cm$^{-1}$. Therefore the Raman amplifier has gain both at $\lambda_1$ and $\lambda_2$, where the gain at $\lambda_2$ is undesired. The parameters of W-fiber 70 are therefore selected to produce cutoff wavelength $\lambda_c$ between $\lambda_1$ and $\lambda_2$, with a great enough loss at $\lambda_2$ to prevent significant degradation of the signal at wavelength $\lambda_1$. Preferably, the loss at $\lambda_2$ is greater than or equal to the Raman gain at $\lambda_2$.

For example, for a pulsed signal having peak powers of 1 kW propagating in fiber 70 whose core 72 has a core area of 35 μm$^2$, the Raman gain at $\lambda_2$ is approximately 13 dB/m. Therefore W-fiber 70 loss at $\lambda_2$ is preferably greater than or equal to 13 dB/m. However, such a large loss is not always necessary, since the light at wavelength $\lambda_2$ must build up from spontaneous emission. Light at wavelength $\lambda_2$ can be amplified by about 7 orders of magnitude, or 70 dB, before reaching the so-called "Raman threshold," after which light at wavelength $\lambda_1$ is rapidly converted to wavelength $\lambda_2$. Thus, W-fiber 70 having a loss that is less than the Raman gain is acceptable, as long as the Raman threshold is never reached.

Alternatively, a cladding-pumped fiber amplifier having a core doped with a rare-earth element as described in examples 1 and 2 above can be utilized to suppress unwanted Raman gain in a fashion similar to the example of FIG. 6D. Such suppression is especially desirable in an amplifier with high peak powers, since otherwise the signal light (wavelength $\lambda_1$) may be inadvertently shifted to another wavelength due to the Raman effect.

The W-fiber of FIG. 1 can also be used in a non-linear optical switch. Many fiber optical switches rely on the intensity dependence of the refractive index of optical fiber. The index of refraction gives an intensity-dependent phase to a signal, which is then directed by use of appropriate structures known in the art, e.g., Mach-Zender interferometer, to one of a number of output ports. The output port to which the signal is directed is determined by an interference condition, which depends upon the impressed phase. The phase may be due to the intensity of the signal alone, or it may result from the intensity of a second beam co-propagating with the signal. However, when the light intensity is sufficiently high to alter the refractive index, it is also great enough to be susceptible to the Raman shift. So here is a case where light at wavelength $\lambda_1$ propagates in a fiber that has no gain at $\lambda_1$ but has gain at $\lambda_2$ due to the Raman effect. Therefore, the W-fiber parameters are selected to produce a cutoff wavelength $\lambda_c$ between $\lambda_1$ and $\lambda_2$, with enough loss at $\lambda_2$ to suppress the Raman effect, as discussed above.

Figure 8:
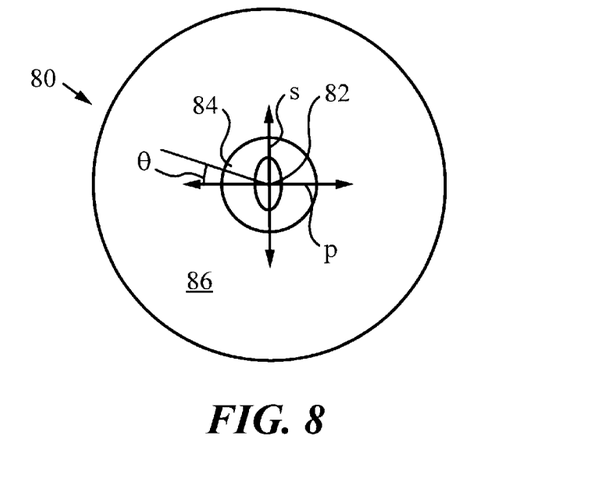
FIG. 8 is a cross sectional view of a polarization-selective W-fiber.

Yet another alternative cross-section of a W-fiber 80 in accordance with the invention is illustrated in FIG. 8. Here a core 82 is elliptical in order to be polarization selective. Core 82 is surrounded by depressed cladding 84 and a secondary cladding 86. In this embodiment light at first wavelength $\lambda_1$ has a first polarization p and a second polarization s orthogonal to the first polarization. Because the cross-sections of core 82 and claddings 84, 86 do not exhibit an overall cylindrical symmetry, the fundamental mode cutoff wavelength $\lambda_c$ can be engineered to be different along the axes of the s and p polarizations using the engineering principles described above. Conveniently, fiber 80 can now be adjusted such that $\lambda_1 < \lambda_c$ for p polarization and $\lambda_1 \geq \lambda_c$ for s polarization.

A person skilled in the art will recognize that the cross sections of claddings 84, 86 can also be selected to be non-cylindrical to aid in this process. Furthermore, the refractive index profile can also be varied as a function of polar angle θ to further aid in this polarization selection process. In fact, a W-fiber of the invention can be implemented in a polarization maintaining fiber or a fiber appropriately stressed to be polarization selective.

The W-fiber of the invention can be used as a short-pass filter, amplifier or laser for telecommunication purposes. For example, the W-fiber can be used as a fiber amplifier in the S-band and employ Erbium as the gain medium. In such application the desired wavelength to be generated can be 1520 nm and the undesired wavelength to be filtered out can be 1530 nm. To achieve this, the W-fiber is engineered to have a fundamental mode cutoff wavelength within the S-band (between, for example, 1525 and 1530 nm).

Fibers with W-profiles engineered according to the invention can be used with various optically active materials in their cores. Such active materials can include rare earth doped glass or just the silica from which the fiber is made. Other materials or dopings as well as other nonlinear materials exhibiting various nonlinear susceptibilities, as known in the art can also be used.

It will be clear to one skilled in the art that the above embodiments may be altered in many ways without departing from the scope of the invention. Accordingly, the scope of the invention should be determined by the following claims and their legal equivalents.

What is claimed is:

1. An apparatus for separating light at a first wavelength $\lambda_1$ from light at a second wavelength $\lambda_2$, where $\lambda_1 < \lambda_2$, said apparatus comprising:
   a) a core having a core cross-section and a refractive index $n_o$, said core comprising an optically active material having a first gain at said first wavelength $\lambda_1$ and a second gain at said second wavelength $\lambda_2$;
   b) a depressed cladding surrounding said core, said depressed cladding having a depressed cladding cross-section and a refractive index $n_1$; and
   c) a secondary cladding surrounding said depressed cladding, said secondary cladding having a secondary cladding cross-section and a refractive index $n_2$;
   wherein said core cross-section, said depressed cladding cross-section, said secondary cladding cross-section and said refractive indices $n_o$, $n_1$, $n_2$ are selected to produce:
   (i) a fundamental mode cutoff wavelength $\lambda_c$ such that $\lambda_1 < \lambda_c < \lambda_2$; and
   (ii) a loss at the second wavelength $\lambda_2$ at least equal to 70 dB less than said gain at said second wavelength $\lambda_2$.

2. The apparatus of claim 1, wherein said core cross-section, said depressed cladding cross-section and said secondary cladding cross-section have cylindrical symmetry.

3. The apparatus of claim 1, wherein said core cross-section, said depressed cladding cross-section, said secondary cladding cross-section and said refractive indices $n_o$, $n_1$, $n_2$ are selected to produce a loss at said second wavelength $\lambda_2$ of at least 100 dB/m.

4. The apparatus of claim 3, wherein said core cross-section, said depressed cladding cross-section, said secondary cladding cross-section and said refractive indices $n_o$, $n_1$, $n_2$ are selected such that said loss at said second wavelength $\lambda_2$ is at least 400 dB/m.

5. The apparatus of claim 1, wherein $\sqrt{(n_2^2 - n_1^2)/(n_o^2 - n_2^2)} \geq 0.224$.

6. The apparatus of claim 1, wherein $\sqrt{(n_2^2 - n_1^2)/(n_o^2 - n_2^2)} \leq 3$.

7. The apparatus of claim 1, wherein said core cross-section has a radius $r_o$, said depressed cladding cross-section has an outer radius $r_1$, and wherein $$\frac{r_1}{r_o} \geq 1 + \sqrt{(n_o^2 - n_2^2)/(n_2^2 - n_1^2)}.$$

8. The apparatus of claim 1, wherein said second gain is due to stimulated Raman scattering.

9. The apparatus of claim 1, wherein said optically active material is a gain medium having said first gain at said first wavelength $\lambda_1$, and said apparatus further comprises an optical feedback to said gain medium, such that said apparatus comprises a laser emitting at said first wavelength $\lambda_1$.

10. The apparatus of claim 9, wherein said core cross-section, said depressed cladding cross-section, said secondary cladding cross-section and said refractive indices $n_o$, $n_1$, $n_2$ are selected to produce a loss at said second wavelength $\lambda_2$ at least equal to said second gain.

11. The apparatus of claim 9, wherein said core cross-section, said depressed cladding cross-section, said secondary cladding cross-section and said refractive indices $n_o$, $n_1$, $n_2$ are selected to produce a loss of at least 100 dB/m at said second wavelength $\lambda_2$.

12. The apparatus of claim 1, wherein said optically active material is a gain medium for amplifying light at said first wavelength $\lambda_1$, such that said apparatus comprises an optical amplifier.

13. The apparatus of claim 12, wherein said core cross-section, said depressed cladding cross-section, said secondary cladding cross-section and said refractive indices $n_o$, $n_1$, $n_2$ are selected to produce a loss at said second wavelength $\lambda_2$ at least equal to said second gain.

14. The apparatus of claim 12, wherein said core cross-section, said depressed cladding cross-section, said secondary cladding cross-section and said refractive indices $n_o$, $n_1$, $n_2$ are selected to produce a loss of at least 100 dB/m at said second wavelength $\lambda_2$.

15. The apparatus of claim 1, wherein said optically active material comprises a nonlinear optical material.

16. The apparatus of claim 1, wherein said optically active material comprises silica.

17. The apparatus of claim 1, wherein said optically active material comprises at least one rare earth element selected form the group consisting of Neodymium, Ytterbium, Erbium, Thulium and Holmium for producing gain at said first wavelength $\lambda_1$.

18. The apparatus of claim 17, wherein said optically active material comprises Erbium, said apparatus is an optical amplifier, and said cut-off wavelength $\lambda_c$ is set substantially between 1525 nm and 1530 nm.

19. The apparatus of claim 17, wherein said optically active material comprises Neodymium, said first wavelength $\lambda_1$ is substantially at 914 nm and said second wavelength $\lambda_2$ is substantially at 1050 nm.

20. The apparatus of claim 17, wherein said optically active material comprises Ytterbium, said first wavelength $\lambda_1$ is substantially at 980 nm and said second wavelength $\lambda_2$ is substantially at 1050 nm.

21. The apparatus of claim 17, wherein said optically active material comprises Erbium, said first wavelength $\lambda_1$ is substantially at 1520 nm and said second wavelength $\lambda_2$ is substantially at 1530 nm.

22. The apparatus of claim 1, wherein said core comprises said optically active material producing light at said second wavelength $\lambda_2$.

23. The apparatus of claim 1, further comprising an outer cladding surrounding said secondary cladding and a pump source optically coupled to said secondary cladding.

24. The apparatus of claim 1, wherein said refractive indices $n_o$, $n_1$, $n_2$ are values averaged over said core cross-section, depressed cladding cross-section and said secondary cladding cross-section respectively.

25. The apparatus of claim 1, wherein said optically active material having a third gain at a third wavelength $\lambda_3$, where $\lambda_c < \lambda_3$.

26. The apparatus of claim 25, wherein said second gain is produced by stimulated emission of said optically active material at said second wavelength $\lambda_2$ and said third gain is due to stimulated Raman scattering of light of said first wavelength $\lambda_1$.

27. The apparatus of claim 1, wherein said light of said first wavelength $\lambda_1$ comprises a first polarization and a second polarization orthogonal to said first polarization and wherein at least one of said core cross-section, said depressed cladding cross-section, said secondary cladding cross-section and said refractive indices $n_o$, $n_1$, $n_2$ is further adjusted such that $\lambda_1 < \lambda_c$ for said first polarization and $\lambda_1 > \lambda_c$ for said second polarization.

28. The apparatus of claim 1, wherein said core, said depressed cladding and said outer cladding comprise a polarization maintaining fiber.

29. The apparatus of claim 1, wherein said core cross-section is elliptical.

30. A method for separating light at a first wavelength $\lambda_1$ from light at a second wavelength $\lambda_2$, where $\lambda_1 < \lambda_2$, said method comprising:
 a) providing a core having a core cross-section and a refractive index $n_o$, said core comprising an optically active material having a first gain at said first wavelength $\lambda_1$;
 b) providing a depressed cladding surrounding said core, said depressed cladding having a depressed cladding cross-section and a refractive index $n_1$; and
 c) providing a secondary cladding surrounding said depressed cladding, said secondary cladding having a secondary cladding cross-section and a refractive index $n_2$; and
 d) selecting said core cross-section, said depressed cladding cross-section, said secondary cladding cross-section and said refractive indices $n_o$, $n_1$, $n_2$ to produce a fundamental mode cutoff wavelength $\lambda_c$ in said core such that $\lambda_1 < \lambda_c < \lambda_2$.

31. The method of claim 30, wherein said step of selecting said core cross-section, said depressed cladding cross-section, said secondary cladding cross-section and said refractive indices $n_o$, $n_1$, $n_2$ is performed such that a loss at said second wavelength $\lambda_2$ is at least 100 dB/m.

32. The method of claim 31, wherein said step of selecting said core cross-section, said depressed cladding cross-section, said secondary cladding cross-section and said refractive indices $n_o$, $n_1$, $n_2$ is performed such that said loss at said second wavelength $\lambda_2$ is at least 400 dB/m.

33. The method of claim 30, wherein said refractive indices $n_o$, $n_1$, $n_2$ are selected such that $\sqrt{(n_2^2 - n_1^2)/(n_o^2 - n_2^2)} \geq 0.224$.

34. The method of claim 30, wherein $\sqrt{(n_2^2 - n_1^2)/(n_o^2 - n_2^2)} \leq 3$.

35. The method of claim 30, wherein said core cross-section has a radius $r_o$, said depressed cladding cross-section has an outer radius $r_1$, and said refractive indices are selected such that $$\frac{r_1}{r_o} \geq 1 + \sqrt{(n_o^2 - n_2^2)/(n_2^2 - n_1^2)}.$$

36. The method of claim 30, wherein said optically active material has a second gain at said second wavelength $\lambda_2$ and said second gain is due to stimulated Raman scattering.

37. The method of claim 30, further providing an optical feedback to said optically active material, wherein said optically active material is a gain medium having said first gain at said first wavelength $\lambda_1$ such that said core emits at said first wavelength $\lambda_1$.

38. The method of claim 37, wherein said core has a second gain at said second wavelength $\lambda_2$ and said core cross-section, said depressed cladding cross-section, said secondary cladding cross-section and said refractive indices $n_o$, $n_1$, $n_2$ are selected to produce a loss at said second wavelength $\lambda_2$ at least equal to said second gain.

39. The method of claim 37, wherein said core has a second gain at said second wavelength $\lambda_2$ and said core cross-section, said depressed cladding cross-section, said secondary cladding cross-section and said refractive indices $n_o$, $n_1$, $n_2$ are selected to produce a loss of at least 100 dB/m at said second wavelength $\lambda_2$.

40. The method of claim 30, wherein said optically active material amplifies light at said first wavelength $\lambda_1$.

41. The method of claim 40, wherein said core has a second gain at said second wavelength $\lambda_2$ and said core cross-section, said depressed cladding cross-section, said secondary cladding cross-section and said refractive indices $n_o$, $n_1$, $n_2$ are selected to produce a loss at said second wavelength $\lambda_2$ at least equal to said second gain.

42. The method of claim 40, wherein said core has a second gain at said second wavelength $\lambda_2$ and said core cross-section, said depressed cladding cross-section, said secondary cladding cross-section and said refractive indices $n_o$, $n_1$, $n_2$ are selected to produce a loss of at least 100 dB/m at said second wavelength $\lambda_2$.

43. The method of claim 30, wherein said light of said first wavelength $\lambda_1$ comprises a first polarization and a second polarization orthogonal to said first polarization and wherein at least one of said core cross-section, said depressed cladding cross-section, said secondary cladding cross-section and said refractive indices $n_o$, $n_1$, $n_2$ is further adjusted such that $\lambda_1 < \lambda_c$ for said first polarization and $\lambda_1 > \lambda_c$ for said second polarization.

44. The method of claim 30, further comprising applying a stress to at least one of said core and said depressed cladding.

* * * * *